Figure 1:
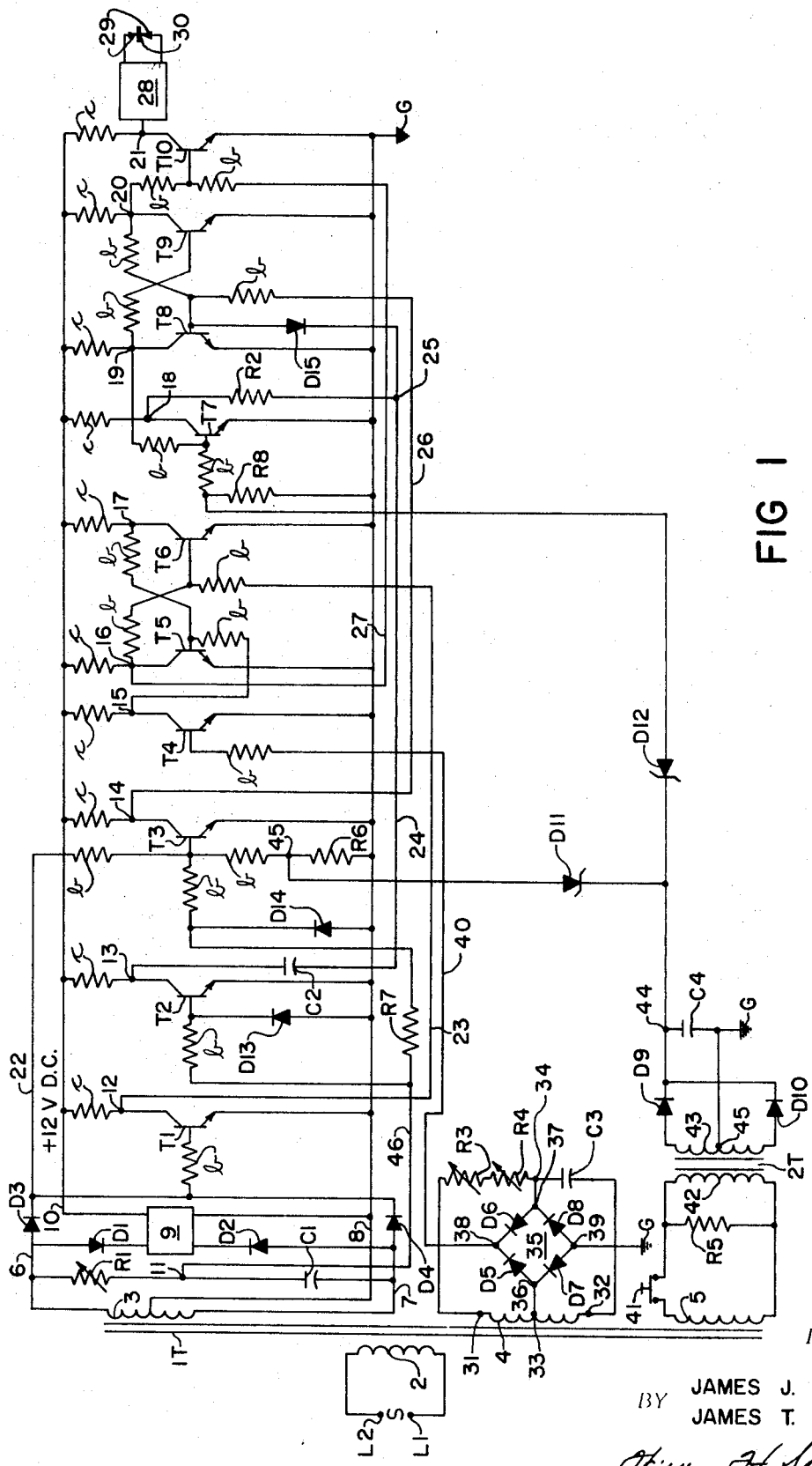

United States Patent

[11] 3,588,435

| [72] | Inventors | James J. Eckl<br>Milwaukee, Wis.;<br>James Thomas Griffin, Scottsdale, Ariz. |
|---|---|---|
| [21] | Appl. No. | 732,676 |
| [22] | Filed | May 28, 1968 |
| [45] | Patented | June 28, 1971 |
| [73] | Assignee | Square D Company<br>Park Ridge, Ill. |

[54] SOLID-STATE HEAT CONTROL AND INITIATING CIRCUIT FOR A RESISTANCE WELDER CONTROL
8 Claims, 2 Drawing Figs.

[52] U.S. Cl. ................................................ 219/108
[51] Int. Cl. ................................................ 219 114,
B23k 11/24
[50] Field of Search .......................................... 219/108,
109, 110, 114; 328/72, 74; 315/194

[56] References Cited
UNITED STATES PATENTS

| 3,243,652 | 3/1966 | Meyer et al. | 219/108 |
| 3,378,696 | 4/1968 | Eckl et al. | 219/108 |

Primary Examiner—J. V. Truhe
Assistant Examiner—J. G. Smith
Attorneys—Harold J. Rathbun and William H. Schmeling ABSTRACT: A solid-state control for a resistance welder which will prevent false tripping of a solid-state logic memory in response to bounce of the contacts of an initiating switch which initiates and terminates welding current flow and a heat control circuit that will provide equal opposite polarity half cycles of welding current flow under varying ambient temperature conditions.

PATENTED JUN 28 1971

3,588,435

SHEET 1 OF 2

INVENTOR.
JAMES J. ECKL
JAMES T. GRIFFIN

BY

William H. Schmeling 3,588,435

1

SOLID-STATE HEAT CONTROL AND INITIATING CIRCUIT FOR A RESISTANCE WELDER CONTROL

This invention relates to control circuits and more particularly to a circuit which will control the flow of energy from an alternating current source to a load, such as the electrodes of a resistance welder.

Resistance welder controls usually are provided with a timing section which includes devices for determining the time interval for performing one or more operations of the welder apparatus and a contact section which, in response to the control exercised by the timing section, controls the flow of energy between an alternating current source and the primary winding of a welding transformer which has its secondary winding connected in series with a pair of welding electrodes.

When resistance welder controls that include a timing section are used, problems resulting from the bounce of the contacts of the initiating switch are avoided by having the switch control a logic memory. However, in certain types of welding apparatus, for example, installations known as press welders, the flow of welding current is dependent on the closure of the contacts of a switch that is actuated by other parts of the welding apparatus. Thus in press welder apparatus the bounce which normally accompanies the closure of any switching device is capable of causing false operation of the control.

Additionally, resistance welder controls usually include circuitry which will provide for heat control to vary the energy delivered to the welding electrodes during each half cycle of the alternating current supply as well as delayed firing circuitry which will prevent the start of welding current flow prior to a predetermined instant in the first half cycle of welding current flow. The delayed firing circuitry is included to prevent saturation of the hypersil transformers and is well known to those skilled in the art. In the circuit according to the present invention, the initiating circuit is arranged to prevent false operation of the welder control by assuring that the weld memory when switched will remain switched to one of its bistable states as long as the initiating contacts are closed and will switch and remain switched to a second of its bistable states when the initiating contacts are opened to terminate the flow of welding current. The heat control portion of the circuit is arranged to be unaffected by ambient temperature changes that normally upset the transistors which have been heretofore used in heat control circuits.

It is an object of the present invention to provide an improved low-cost heat control circuit for a resistance welder which will provide equal half cycles of alternating weld current flow under varying ambient temperature conditions.

Another object is to provide an improved initiating circuit for a resistance welder control wherein the beginning and termination of weld current flow is controlled by switch contacts that will eliminate the effect of contact bounce on the control when the switch is operated.

An additional object is to provide an improved low-cost heat control circuit for a resistance welder which will provide equal half cycles of alternating weld current flow under varying ambient temperature conditions and to provide an improved initiating circuit for a resistance welder control wherein the beginning and termination of weld current flow is controlled by switch contacts that will eliminate the effect of contact bounce on the control when the switch is operated.

An additional object is to provide an improved low-cost heat control circuit for a resistance welder which will provide equal half cycles of alternating weld current flow under varying ambient temperature conditions and to provide an improved initiating circuit for a resistance welder control wherein the beginning and termination of weld current flow is controlled by switch contacts that will eliminate the effect of contact bounce on the control when the switch is operated and to electrically isolate the initiating circuit, the heat control circuit and the logic circuit from each other so the effects of contact bounce are not transmitted to the other circuits.

Further objects and features of the invention will be readily apparent to those skilled in the art from the specification and appended drawing illustrating certain preferred embodiments in which:

FIG. 1 schematically shows a solid-state resistance welder control system in accordance with the present invention.

Figure 2:
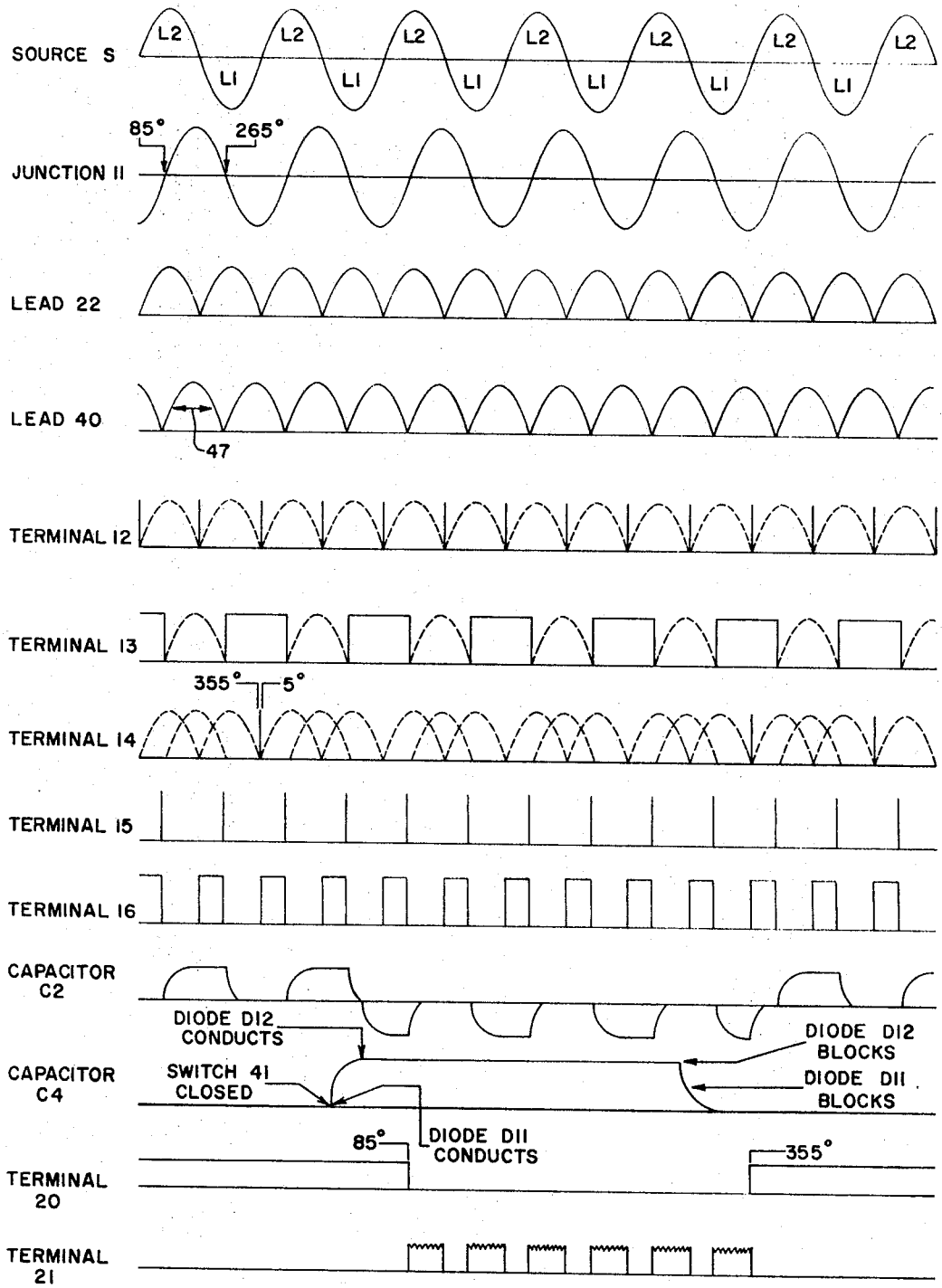

FIG. 2 illustrates the curves and the signals with time as a reference provided by the components in the circuit shown in FIG. 1.

In the circuit shown in the drawing, a transformer IT has a primary winding 2 connected across the terminals L1 and L2 of a source S of alternating current and three secondary windings 3, 4 and 5. The secondary winding 3 has a pair of output terminals connected to supply a pair of output leads 6 and 7 with alternating current and a center tap connected to a lead 8 that is connected to a common ground G for the system. The leads 6 and 7 are respectively connected through a pair of diodes D1 and D2 to a pair of input terminals of a direct current voltage regulator 9. The regulator 9 may be of any well-known type and has a pair of output terminals connected to supply a filtered regulated constant direct current voltage between the lead 8 and a lead 10, making the lead 10 positive in polarity relative to the lead 8. In the circuit shown, the regulator 9 maintains a 12-volt potential between the leads 8 and 10. Additionally connected across the leads 6 and 7 is a phase shift circuit including an adjustable resistor R1, capacitor C1 and a junction 11. The resistor R1 and the capacitor C1 respectively have one side connected to the leads 6 and 7 and a second side connected to the junction 11 so the voltage appearing between the junction 11 and the lead 8 is shifted in phase relative to the voltage across the leads 6 and 7 by a value depending upon the adjustment of the resistor R1.

The circuit includes transistors designated as T1—T10. Each of the transistors T1—T10 is of the NPN type and has a collector electrode connected through a suitable collector load resistor, designated as $c$ to the lead 10, an emitter electrode directly connected to the lead 8 and a base electrode which is connected to receive input signals through resistors designated as $b$ from signal sources, as will be later described. Connected between the collector resistor $c$ and the collector electrode of the transistors T1—T10 respectively are junctions 12—21 which act as output terminals for the transistors T1—T10. The leads 6 and 7 are respectively connected through diodes D3 and D4 to supply a lead 22 and the bases of the transistors T1 and T3 with full wave rectified direct current voltage pulses from the supply S. The output terminal 12 of the transistor T1 is connected through a lead 23 to supply an input to the base of transistor T6. The output terminal 13 of the transistor T2 is connected through a capacitor C2 and a lead 24 to a junction 25. The junction 25 is connected through a resistor R2 to the collector of the transistor T7 and the terminal 18 and is directly connected to the base of the transistor T8 through a diode D15. The diode D15 is poled to conduct current from the base of the transistor T8 to the junction 25 and block current flow in the reverse direction. The output terminal 14 of the transistor T3 is connected through a lead 26 to the base of the transistor T8. Similarly, the output terminal 15 of the transistor T4 is connected to the base of the transistor T5. The transistors T5 and T6 are connected to act as a flip-flop and provide a logic memory function with the terminal 16 of the transistor T5 connected to the base of the transistor T6 and the terminal 17 of the transistor T6 connected to the base of the transistor T5. The output terminal of the memory is provided by the terminal 16 which is connected through a lead 27 to the base of the transistor T10. The transistors T8 and T9 also are connected as a flip-flop to provide a logic memory function with the terminal 19 connected to the base of the transistor T9 and the terminal 20 connected to the base of the transistor T8. The memory, including the transistors T8 and T9, has a pair of output terminals 19 and 20 which are respectively connected to the bases of the transistors T7 and T10. The output terminal 21 of the transistor T10 is connected to supply an input to suitable circuitry indicated as a firing circuit 28 which will control the flow of welding current through a pair of welding electrodes 29 for the purpose of welding a pair of workpieces 30 together. The firing circuit 28 may be of any well-known type which will initiate and terminate the flow of welding current pulses through the workpieces 30 in response to signal changes at the terminal 21 in a manner disclosed in a U.S. Pat. No. 3,315,098 which issued on Apr. 18, 1967 and is assigned by the inventor James J. Eckl to the assignee of the present invention.

The secondary winding 4 has a pair of output terminals 31 and 32 and a center tap 33 located so the voltage outputs of the two halves of the winding 4 are equal. The terminal 31 is connected through a pair of series connected adjustable resistors R3 and R4 to a junction 34. Similarly, the terminal 32 is connected through a capacitor C3 to the junction 34. A full wave bridge rectifier 35 has a pair of input terminals 36 and 37 respectively connected to the center tap 33 and the junction 34. The rectifier 35 has a pair of output terminals 38 and 39 and diodes D5—D8 connected between the input terminals 36 and 37 and the output terminals 38 and 39 so the terminal 38 has a positive polarity relative to the terminal 39. The diodes D5—D8 preferably are selected to have identical characteristics including their changes in response to variations in ambient temperature. The output terminal 39 is connected through the ground G to the lead 8 and the output terminal 38 is connected by a lead 40 to the base of the transistor T4.

The secondary winding 5 has a pair of output terminals connected through the contacts of a switch 41 to supply a primary winding 42 of a transformer 2T and a load resistor R5 when the contacts of the switch 41 are closed. The transformer 2T has a secondary winding 43. The secondary winding 43 has a pair of output terminals connected through a pair of diodes D9 and D10 to supply a junction 44. The secondary winding 43 also has a center tap 45 which is connected through the ground G to the lead 8. A capacitor C4 is connected between the junction 44 and the ground G. The diodes D9 and D10 are poled to rectify the output of the secondary winding 43 and cause the capacitor C4 to be charged with pulses of full wave rectified direct current in a direction making the junction 44 side of the capacitor C4 positive in polarity. The junction 44 is connected through a Zener-type diode D11 to a junction 45. The junction 45 in turn is connected through a base resistor $b$ to the base of the transistor T3 and through a resistor R6 to lead 8. Additionally, the junction 44 is connected through a Zener-type diode D12 to the base of the transistor T7. The Zener diodes D11 and D12 are selected to have dissimilar current-blocking characteristics with the diode D11 switching from a current-blocking to a conducting current mode when the voltage across the capacitor C4 reaches 5 volts and the diode D12 switching from a current-blocking to a current-conducting mode when the capacitor C4 charge exceeds 9 volts. The junction 11 is connected to a lead 46. The lead 46 is connected to the base of the transistor T2 and through a resistor R7 to the base of the transistor T3. A diode D13 has its cathode directly connected to the base of the transistor T2 and its anode to the lead 8. Similarly, a diode D14 has its anode connected to the lead 8 and its cathode connected to a junction between the base resistor $b$ of the transistor T2 and the resistor R7.

The operation of the circuit in FIG. 1 will now be described in connection with the curves shown in FIG. 2 in which the abscissa represents time and the ordinates represent potentials at the circuit locations designated in FIG. 1 with reference to the ground G. In FIG. 2 the curve designated as S represents the voltage wave of the alternating current source S which energizes the transformer 1T. The remaining curves in FIG. 2 are drawn with reference to particular instants in time with reference to the curve indicated as S. It is to be appreciated that the curves shown in FIG. 2 are for illustrative purposes only and may not represent actual curves as may be obtained by an oscilloscope. The transistors T1—T10 are of the NPN type and are connected in the circuit to operate as positive NOR logic elements to provide signals at their associated output terminals 12—21. For illustrative purposes, as hereinafter used, a signal designated as "0" will represent a signal level approximately ground potential or zero volts and a signal designated as "1" represents a signal positive in potential relative to ground which is sufficient to switch the transistor to which base it is applied to a conductive state. The operation of the positive NOR transistor circuits is well known and can be stated by the well-known rule that if any input to the base of the NOR transistor is 1, the output at its associated collector terminal is "0," and only if all the inputs to the base are "0" will the output at the collector terminal be "1."

The alternating polarity voltage source S energizes the primary winding 2 with successive half cycles of alternating polarity current graphically shown by the curve S in FIG. 2, wherein the half cycle L2 indicates an interval wherein the source terminal L2 has a positive polarity relative to the terminal L1 and the half cycle designated as L1 designates an interval wherein the terminal L1 is positive in polarity relative to the terminal L2. The energization of the primary winding 2 causes the secondary windings 3, 4 and 5 to provide an alternating polarity current at their respective output terminals which corresponds to the curve S in FIG. 2. The output terminals of the secondary winding 3 are connected to the leads 6 and 7. The lead 6 is connected through the adjustable resistor R1 to the junction 11 and the lead 7 is connected through the capacitor C1 to the junction 11. The resistor R1 and the capacitor C1 acts as a phase shift network and cause a signal to appear at the junction 11, as shown in FIG. 2, which is shifted in time relative to the source S an adjustable amount depending upon the settings of the resistor R1. In the circuit shown, the resistor R1 is adjusted so the potential at the terminal 11 will become positive in polarity at 85° after the beginning of each L2 half cycle of the source S.

The output of the secondary winding 3 is delivered through the diodes D3 and D4 to the lead 22 and appears as a series of positive polarity direct current signal pulses having a zero potential when the voltage of the source reverses as shown by the curve designated as lead 22 in FIG. 2. The positive polarity signal pulses on lead 22 are impressed as input signals to the bases of the transistors T1 and T3 and biases the transistors T1 and T3 to conduction, and permit the transistors T1 and T3 to switch to a nonconductive state during a brief interval of approximately 10 electrical degrees as the positive polarity signal pulses on the lead 22 approach a zero potential. Thus the transistor T1 acts as a synchronizing means and receives an input to its base only from the lead 22, the terminal 12, as shown on the terminal 12 curve in FIG. 2, will provide a series of synchronized positive voltage "1" pulses at the end of each L1 and L2 half cycle of the source S voltage.

The output terminal 31 of the secondary winding 4 is connected through the pair of series connected adjustable resistors R3 and R4 to the junction 34. Similarly, the output terminal 32 is connected through the capacitor C3 to the junction 34. The resistors R3 and R4 and the capacitor C3 act as a phase shift network and, as shown by the lead 40 curve in FIG. 2, cause the potential between the junction 34 and the center tap 33 to be shifted in phase relative to the alternating polarity at the terminals 31 and 32 an adjustable amount depending upon the settings of the resistors R3 and R4. One of the resistors, e.g., resistor R3, may be used as a fixed adjustment to compensate the system for power factor variations in the welding apparatus as is well known to those skilled in the art. The other resistor, e.g., resistor R4, may be used to vary the phase shift of the potential at the junction 34 and adjustable amount as depicted by the arrow 47 in the lead 40 curve in FIG. 2 to provide a heat control means function for the circuit as is also well known to those skilled in the art.

The transistor T2 which provides the delayed firing means function for the control receives an input from the junction 11 through the lead 46. The diode D13 is connected to the base of the transistor T2 to clip the negative voltage pulses appearing at the junction 11. Thus the transistor T2 is biased to conduction and provides a "0" output signal when the signal at junction 11 has a positive polarity and switches to a nonconductive state to provide a "1" signal at terminal 13 during the interval when the output signal at junction 11 is clipped by the diode D13. The signal appearing at the junction 11 is adjusted by the resistor R1 so the signal output of the transistor T2 appears at the terminal 13 as an oscillating signal called the delayed firing signal, which changes from "1" to "0" at 85 electrical degrees during each L2 half cycle, and from "0" to "1" during each L1 half cycle of the source S. 185 In addition to the signal provided by the lead 22, the transistor T3 also receives an input signal at its base from the junction 11 through a circuit that includes the lead 46 and the resistor R7. The diode D14 is provided to clip the signal whenever the polarity at the junction 11 becomes negative. Thus as shown by the dotted portions of the terminal 14 curve, the transistor T3 receives input signals at its base from both the junction 11 and the lead 22. The combined signals at the base of the transistor T3 are arranged so that the only instant during which the transistor T3 is not biased to conduction to provide a "1" signal at the terminal 14 is at the end of an L1 cycle and the beginning of an L2 half cycle. The circuit components are preferably selected so that the "1" signal at the terminal 14 which is called the lead trail signal has a duration of approximately 10 electrical degrees with the signal "1" beginning at 355° at the end of an L1 half cycle and terminating at the beginning of an L2 half cycle.

The heat control phase shift circuit including the secondary winding 4, the resistors R3 and R4, the capacitor C3 and the bridge rectifier 35 which has its input terminals 36 and 37 connected between the ungrounded center tap 33 and the junction 34, is arranged to provide an output signal at lead 40 as shown by the similarly designated curve in FIG. 2. The diodes D5—D8 are poled so the output of the secondary winding 4, as rectified by the rectifier 34, is delivered to the lead 40 as a series of half cycle positive polarity pulses. The output pulses of the rectifier 35 each have an equal time duration and begin precisely at the same instant in time relative to the half cycles of the source S voltage wave which instant is adjustable as determined by the adjustment of the resistor R4 and indicated by the arrow 47. One of the advantages of the heat control circuit herein disclosed is that it is virtually insensitive to temperature changes in that the rectified direct current pulses are equal in duration for both the L1 and the L2 half cycles of the source S and the time instant at which the voltage rises to begin each current pulse will be the same during each L1 and L2 half cycle. This ambient temperature insensitivity is achieved by the ungrounded equally balanced winding sections between the center tap 33 and the output terminals 31 and 32 of the secondary winding 4 and the fact that the diodes D5—D8 have the same characteristics.

The positive polarity direct current signal pulses having a zero potential between each pulse, as impressed on the lead 40, are delivered as inputs to the base of the transistor T4. The transistor T4 which provides an input to the heat control memory that includes transistors T5 and T6, in response to the input pulses on its base, delivers a "1" output pulse during each L1 and L2 half cycle as the signal on lead 40 becomes zero as shown by the terminal 15 curve in FIG. 2. As the signal pulses appearing on the lead 40 begin at the same instant during each L1 and L2 half cycle of the source S and have equal time duration, the "1" output pulses at the terminal 15 will be equally spaced and occur at the same instants during each L1 and L2 half cycle.

The heat control memory including the transistors T5 and T6 receives inputs from the terminal 12 and the terminal 15 with the terminal 12 supplying the base of the transistor T6 with an input via the lead 23 and the terminal 15 supplying the base of the transistor T5 with an input. The input at the terminal 12 becomes "1" at approximately 5° before the end of each L1 and L2 half cycle of the source S. Thus at 5° before the end of each L1 and L2 half cycle of the source S, the transistor T6 output signal at the terminal 17 becomes "0" during an interval when the signal at the terminal 15 is "0." Thus as both inputs to the base of the transistor T5 are "0," the signal at the terminal 16 becomes "1" and is impressed on the base of the transistor T6 to maintain the "0" signal at the terminal 17. At some instant during each L1 and L2 half cycle of the source S and after the signal at the terminal 16 is "1," the signal at the 15 becomes a momentary "1." While the instant at which the signal at terminal 15 becomes "1" may occur any adjustable time during the L1 and L2 half cycles, for purposes of explanation, the instant has been selected by the adjustment of the resistor R4 to occur prior to 85° during a L2 half cycle, to illustrate the operation of the delayed firing portion of the circuit, as will be later described. Thus some time prior to 85° during an L2 half cycle and 265° during an L1 half cycle the input signal to the base of the transistor T5 from the terminal 15 becomes a momentary "1" and in response thereto the transistor T5 switches to a conductive state and supplies a "0" signal at the terminal 16. The "0" signal at the terminal 16 along with the "0" signal present at the terminal 12 causes the transistor T6 to switch to a nonconductive condition and provide a "1" signal at the terminal 17. The "1" signal present at the terminal 17 is transmitted to the base of the transistor T5 and causes the transistor T5 to remain conductive until a subsequent "1" signal which appears at the junction 12 again switches the transistor T6 so a "0" signal which appears at the terminal 17 causes the heat control memory to switch and provide a "1" signal at the terminal 16. Thus the signals appearing at the junction 12 and the terminal 15 will cause the heat control memory to be switched so the signal at the terminal 16 becomes "1" at 185° and 355° during each respective L2 and L1 half cycle and to switch from "1" to "0" at an instant during a subsequent L1 and L2 half cycle as determined by the output signal at the terminal 15 as is illustrated by the curve identified as terminal 16 in FIG. 2.

As previously described, and shown by the curve entitled terminal 14 in FIG. 2, the lead trail signal at the terminal 14 becomes a momentary "1" at 355° at the end of each L2 cycle. The "1" signal at the terminal 14 is applied to the base of the transistor T8 and switches the transistors T8 and T9 of the weld memory to a continuing state wherein the transistor T8 is conducting to provide a "0" signal at the terminal 19 and the transistor T9 is nonconducting and provides a "1" signal at the terminal 20. The "0" signal at the terminal 19 is also applied to the base of the transistor T7. During all periods when the switch 41 is open, the transformer 2T is deenergized, and the capacitor C4 is discharged so a "0" signal appears at the base of the transistor T7 through the diode D12. Thus as all of the inputs to the base of the transistor T7 are "0," a "1" signal appears at the terminal 18 which is connected through the resistor R2, the junction 25, the lead 24 and the capacitor C2 to the terminal 13. As previously described and shown by the terminal 13 curve in FIG. 2, the delayed firing signal at the terminal 13 appears as an oscillating signal which changes from "1" to "0" at 85° during each L2 half cycle and from "0" to "1" at approximately 265° during each subsequent L1 half cycle. Thus when the signal at the terminal 13 is "0" and the signal at the terminal 18 is "1," the capacitor C2 is charged in a direction making the resistor R2 side positive in polarity and when the signal at the terminal 13 becomes "1," the charge on the capacitor C2 dissipates. The effect of the charge making the resistor R2 side of the capacitor C2 positive in polarity is not used in the circuit and is merely included for descriptive purposes and is shown on the capacitor C2 curve in FIG. 2.

The switch 41 is subject to random closure during any L1 or L2 half cycle and, while for purposes of description the switch 41 is indicated as being closed during an L1 half cycle, it is to be appreciated that its closure at any time will not affect the following description.

The closure of the switch 41 initiates the weld interval and results in the energization of the transformer 2T. The diodes D9 and D10 form a full wave rectifying bridge and through the capacitor C4 a gradually increasing positive voltage is established at the junction 44. The components of the charging circuit for the capacitor C4 are preferably selected so the charging of the capacitor C4 is accomplished in less than a half cycle of the source S. When the voltage at the junction 44 reaches 5 volts, the Zener diode D11 conducts and still later when the junction 44 voltage reaches 9 volts, the Zener diode D12 conducts. The conduction of the Zener diode D11 causes a "1" signal to be applied to the base of the lead trail transistor T3 so that the lead trail signal at the terminal 14 becomes a continuing "0." The continuing "0" at the terminal 14 is applied to the base of the transistor T8 via the lead 26 and removes a signal called the lead trail signal which appears at the terminal 14 during the remaining interval when the switch 41 is closed so that the weld memory, including the transistors T8 and T9, is conditioned for switching. When the charge on the capacitor C4 reaches 9 volts, the Zener diode D12 conducts and supplies a "1" signal to the base of the transistor T7. The "1" signal input to the transistor T7 causes the signal at the terminal 18 to change from a continuous "1" to a "0" and because of the random type closure of switch 41 may occur at any instant in time which is always subsequent to the conditioning of the weld memory for switching as caused by the change from a "1" to a "0" signal at the terminal 14. As shown, the signal at the terminal 18 changes to "0" while the signal at the terminal 13 is "1." Thus the capacitor C2 charges in a direction making the terminal 18 side thereof negative in polarity as illustrated by the capacitor C2 curve. Exactly at 85° during a L2 half cycle the signal at the terminal 13 changes from "1" to "0. The change from "1" to "0" at the terminal 13 causes the capacitor 2C to rapidly discharge and impress a sharp negative voltage signal through the diode D15 to the base of the transistor T8 which switches the transistor T8 to a nonconductive state and causes a "1" signal to appear at the terminal 19. During the remainder of the interval when the switch 41 is closed, the capacitor C2 charges and discharges because of the signal changes at the terminal 13. However, the signal change across the capacitor C2 has no further effect on the conductive state of the transistor T8. The "1" signal at the terminal 19 is applied to the bases of transistors T7 and T9 and maintains the transistor T7 conductive so a "0" signal continues at the terminal 18 and switches the transistor T9 to a conductive state so a "0" signal appears at the terminal 20. The change to a "0" at the terminal 20 occurs at 85° during an L2 half cycle because the signal change at the terminal 13 which controlled the switch of the weld memory including the transistors T7 and T8 occurred at 85° during the L2 half cycle. The removal of the "1" signal at the terminal 20 permits the conduction of the transistor T10, which acts as an output signal means for the circuit, to be controlled by the signal changes at the terminal 16 which at the time of switching of the signal at the terminal 20 is supplying a "0" signal and thus the transistor T10 switches from its conductive state to supply a "1" output signal at 85° during an L2 half cycle. It is apparent that if the resistor R4 had been adjusted so the signal change at the terminal 16 occurred after 85° in a L2 half cycle, the change of a signal to "0" at the terminal 20 would not have caused a signal change at the terminal 21. During the remainder of the interval the switch 41 is closed, the signal at the terminal 20 remains "0" and the switching of the transistor T10 is controlled by the signals at the terminal 16. The signal at the terminal 16 changes to "1" at beginning of each L1 and L2 half cycle and to "0" during each L1 and L2 half cycle, as shown by the terminal 16 curve. Thus after the signal at the terminal 21 has initially changed to "1" at 85° during an L2 half cycle, the signal at the terminal 16 will cause a signal change to "0" at the end of the L2 half cycle and during the remainder of the interval when a "0" signal is present at the terminal 20, the signal at the output terminal 21 will switch from "0" to "1" during each half cycle in response to the "1" and "0" signal changes at the terminal 16.

As shown in the terminal 21 curve in FIG. 2, the duration of the "1" signal pulse during the first L2 half cycle is slightly shorter than the duration of the "1" signals during the remaining half cycles. This result is achieved because the adjustment of the resistor R4 required a signal change at the terminal 15 earlier than 85° during the half cycles. Obviously, if the resistor R4 is adjusted to require a signal change at the terminal 15 later than 85°, the duration of the "1" signal pulses at the terminal 21 during the first L2 half cycle will be equal to the duration of the signal during the succeeding half cycle. The presence of a "1" signal at the terminal 21 is delivered as an input to the firing circuit 28 which in response thereto in a manner disclosed in the Eckl patent supra, causes a current flow through the welding electrodes 29 and the workpieces for the purpose of welding the workpieces together in a manner well known to those skilled in the art. As shown, the pulses appearing at the terminal 21 have a ragged upper edge which is caused by the capacitive nature of the firing circuit 28 and further explanation thereof is not required.

While the initiating switch 21 may be opened during any instant during an L1 or L2 half cycle, for purposes of description as shown on the capacitor C4 curve in FIG. 2, the switch 41 is shown as opening during an L2 half cycle. It is to be appreciated that the time of opening of the switch 41 will not affect the lead trail signal at the terminal 21 which controls the termination of the flow of weld current through the electrodes 29 and 30. When the switch 41 opens, the transformer 2T is deenergized and the charging of the capacitor C4 terminates. The charge on the capacitor C4 then decays through circuits including the leakage paths provided by the diodes D11 and D12, the junction 45 and the resistors R6 and R8. When the charge on capacitor C4 is decreased to a value of 9 volts, diode D12 resumes its blocking characteristics and removes the "1" input to the transistor T7. The signal at the terminal 18 remains unchanged however, because the terminal 19 continues to deliver a "1" signal to the base of the transistor T7. When the charge on the capacitor C4 is decayed to a value of 5 volts, the diode D11 resumes its blocking characteristics and the "1" signal input through junction 45 to the base of the transistor T3 becomes "0." This change in signal may occur at any time during a L2 or L1 half cycle and conditions the lead trail transistor T3 so that it is controlled by the signals appearing at lead 22 and the terminal 11. As shown in the terminal 14 curve in FIG. 2, at 355° the signals from the lead 22 and the junction 11 permit the transistor T3 to switch to a nonconductive state to provide a momentary "1" signal at the terminal 14. Thus at the end of an L1 half cycle, the "1" signal at the terminal 14 is transmitted through the lead 26 to the base of the weld memory transistor T8 which in response thereto switches to a conductive state and causes a "0" signal to appear at the terminal 19 and a "1" signal to appear at the terminal 20. The "1" signal at terminal 20 biases the transistor T10 into a conduction and causes a continuous "0" signal to appear at the output terminal 21 which causes the firing circuit 28 to terminate the welding current flow through the welding electrodes 29. The presence of the "0" signal at terminal 19 causes the weld memory input transistor T7 to resume its conductive state so that the capacitor C2 discharges and charges in a direction making the junction side thereof positive in polarity, as precedingly described. This charge, as previously indicated, is without effect in the circuit.

Among the advantages achieved by the circuit described is the isolation provided by the individual secondary windings 3, 4 and 5 and that contact bounce of the initiating switch 41 will not cause erratic operation of the control. The closure of the initiating switch 41, which may be the contacts of a relay or a limit switch as actuated by a press welder, controls the charging of the capacitor C4. Thus any contact bounce of the switch 41 before the charge on the capacitor C4 reaches 5 volts will have no effect on the circuit. When the charge on the capacitor C4 equals 5 volts, the diode D11 conducts and prevents the transistor T3 from switching to supply a lead trail "1" signal at 355° from appearing at the base of the transistor T8. In event that contact bounce of the switch 41 should permit the transistor T3 to supply a false "1" lead trail signal, conduction of the transistor T8 will not change because of the presence of the "1" signal at the terminal 20 so that when the signal at the terminal 14 finally reaches a continuous "0," the weld memory including the transistors T8—T9 is merely conditioned for switching after the charge on the capacitor reaches 9 volts. When the charge on the capacitor reaches 9 volts, the transistor T7 switches and the capacitor C2 charges. In the event that the charge on capacitor C2 is insufficient to cause a switching of the transistor T8 when the transistor T2 switches at 85° during an L2 half cycle, welding current will not flow during the subsequent L1 half cycle because the weld memory will not have switched to cause a "0" to be present at the terminal 21.

Contact bounce during the opening of the switch 41 also will not cause erratic operation of the control. When the switch 41 opens, the charge on the capacitor C4 decays and the diode D12 blocks the "1" signal to the base of the transistor T7. The removal of the "1" signal through the diode D12 does not affect the conduction of the transistor T7 as the weld memory including the terminal 19 continues to a "1" signal to the base of the transistor T7.

When the charge on the capacitor C4 reaches 5 volts, the diode D11 removes a "1" signal to the base of the transistor T3. Thus the bounce of the contacts of the switch 41 must cause a greater than 4-volt rise in the change on the capacitor C4 before the circuit will be affected. As the circuit parameters prevent this 4-volt rise from occurring, lead trail firing of the firing circuit 28 is assured for the advantages well known to those skilled in the art.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. In a resistance welder control, the combination comprising: an alternating polarity voltage source, delayed firing means energized by the source having an output providing an output signal that is displaced in phase a preselected value relative to the reversals in polarity of the source, heat control means energized by the source having an output providing an output signal that is displaced in phase a preselected adjustable value relative to the reversals in polarity of the source, synchronizing means energized by the source having an output providing an output signal that is synchronized with reversals in polarity of the source, lead trail means having inputs connected to receive the output signals from the outputs of the delayed firing and synchronizing means, said lead trail means having an output providing an output signal only when the alternating polarity of the source reverses from a first to a second polarity, a heat control memory including a bistable state logic memory having a first input connected to receive the output signals from the outputs of the synchronizing means for switching the heat control logic memory to a first of its bistable states in response to an output signal from the synchronizing means, a second input connected to receive the output signals from the heat control means for switching the heat control memory to a second of its bistable states in response to an output signal at the output of the heat control means, said heat control memory having an output terminal providing an output signal when the heat control memory is in a selected one of its bistable states, a weld memory means including a bistable state logic memory having a first input connected to receive input signals from the lead trail means for switching the weld logic memory to a first of its bistable states in response to an output signal at the output of the lead trail means, an initiating circuit including a chargeable capacitor, a set of operable switching contacts, means for charging the capacitor upon operation of the switching contacts, a pair of Zener-type diodes, means connecting a first one of the pair of diodes between the capacitor and an input to the lead trail means in a direction for preventing the lead trail means from providing an output signal when the charge on the capacitor exceeds a first preselected voltage and means connecting a second one of the pair of diodes between the capacitor and a second input of the weld memory in a direction for switching of the weld memory to a second of its bistable states in response to an output signal from the delayed firing means after the charge on the capacitor exceeds a second voltage that exceeds the first voltage by a predetermined value.

2. The combination recited in claim 1 wherein the heat control means includes a transformer having a secondary winding energized by the source, said secondary winding having a pair of output terminals and a center tap dividing the secondary winding into a pair of sections having equal voltage outputs, means connecting the output terminals to a common junction providing an alternating polarity voltage signal between the common junction and the center tap which is out of phase with the alternating voltage of the source, a full wave rectifying diode bridge having inputs connected to the common junction and the center tap and an output terminal providing full wave direct current voltage signal pulses that are synchronized with the alternating polarity voltage signal.

3. The resistance welder as recited in claim 1 wherein the weld logic memory has an output terminal that provides an output signal indicative of the bistable state of the weld memory and wherein the combination includes an output signal means having a pair of inputs connected to receive the output signals from the heat control memory and the weld memory and supply output signals in response to the switching of the heat control memory to its bistable states after the weld memory has switched to its second bistable state.

4. The combination as recited in claim 3 wherein the output signal means supplies input signals to a means for controlling welding current flow through a pair of welding electrodes.

5. The combination as recited in claim 1 wherein the means connecting the second one of the pair of diodes between the capacitor and a second input to the weld memory includes a solid-state switch having an input connected through the second diode to the capacitor and an output terminal connected through a first circuit that includes a second capacitor to the delayed firing means and through a second circuit that includes the second input of the weld memory.

6. The combination as recited in claim 2 wherein the means connecting the output terminals to the common junctions includes a capacitor having opposite sides connected between one of the pair of output terminals and the common junction and at least one adjustable resistor having opposite ends connected between the other of said pair of output terminals and the common junction.

7. The combination as recited in claim 1 wherein the delayed firing means, the synchronizing means and the lead trail means are energized by a first transformer winding, the heat control means is energized by a second transformer winding, and the initiating circuit is energized by a third transformer winding.

8. The combination as recited in claim 7 wherein the first, the second and the third transformer windings each have a center tap and the center taps of the first and the third transformer windings are connected to a common ground and the center tap of the second transformer winding is ungrounded.

PO-1050
(5/69)

UNITED STATES PATENT OFFICE
CERTIFICATE OF CORRECTION

Patent No. 3,588,435          Dated June 28, 1971

Inventor(s) James J. Eckl and James Thomas Griffin

It is certified that error appears in the above-identified patent and that said Letters Patent are hereby corrected as shown below:

Col. 4, true line 26, (appearing as line 27), cancel "acts" and insert --act--.
Col. 5, line 8, cancel "185".
Col. 6, line 5, after "the" insert --terminal--(2nd occurrence)
Col.10, line 6, after "signal" insert --at its output--.

Signed and sealed this 4th day of January 1972.

(SEAL)
Attest:

EDWARD M.FLETCHER,JR.          ROBERT GOTTSCHALK
Attesting Officer              Acting Commissioner of Patents